US007565213B2

(12) United States Patent
Dittmar et al.

(10) Patent No.: US 7,565,213 B2
(45) Date of Patent: Jul. 21, 2009

(54) DEVICE AND METHOD FOR ANALYZING AN INFORMATION SIGNAL

(75) Inventors: Christian Dittmar, Ilmenau (DE); Christian Uhle, Ilmenau (DE); Jürgen Herre, Buckenhof (DE)

(73) Assignee: Gracenote, Inc., Emeryville, CA (US)

( * ) Notice: Subject to any disclaimer, the term of this patent is extended or adjusted under 35 U.S.C. 154(b) by 728 days.

(21) Appl. No.: 11/123,474

(22) Filed: May 5, 2005

(65) Prior Publication Data

US 2005/0273319 A1 Dec. 8, 2005

Related U.S. Application Data

(60) Provisional application No. 60/569,423, filed on May 7, 2004.

(30) Foreign Application Priority Data

May 7, 2004 (DE) ....................... 10 2004 022 660

(51) Int. Cl.

*G06F 17/26* (2006.01)
*G06F 17/00* (2006.01)
*G06F 17/14* (2006.01)
*G10L 15/00* (2006.01)
*G10L 15/02* (2006.01)
*G10L 15/06* (2006.01)

(52) U.S. Cl. .......................... 700/94; 704/236; 704/243

(58) Field of Classification Search ...... 704/200–200.1, 704/205–211, 236–246, 270, 272, E19.001–E19.002, 704/E19.012, E11.001–E11.007; 381/104–107; 700/90–94

See application file for complete search history.

(56) References Cited

U.S. PATENT DOCUMENTS 3,581,192 A * 5/1971 Miura et al. ............. 324/76.31

(Continued)

FOREIGN PATENT DOCUMENTS

GB 2363227 12/2001

(Continued)

OTHER PUBLICATIONS

Heittola, et al. "Locating Segments with Drums in Music Signals." IRCAM. 2002.

(Continued)

*Primary Examiner*—David R Hudspeth
*Assistant Examiner*—David Kovacek
(74) *Attorney, Agent, or Firm*—Schwegman, Lundberg & Woessner, P.A.

(57) ABSTRACT

A significant short-time spectrum is extracted from an information signal, the means for extracting being configured to extract such short-time spectra which come closer to a specific characteristic than others. The short-time spectra extracted are then decomposed into component signals using ICA analysis, a component signal spectrum representing a profile spectrum of a tone source which generates a tone corresponding to the characteristic sought. From a sequence of short-time spectra of the information signal and from the profile spectra determined, an amplitude envelope is calculated for each profile spectrum to indicate how a tone source profile spectrum changes over time. The profile spectra and all the amplitude envelopes associated therewith provide a description of the information signal which may be evaluated further, for example for transcription purposes in the case of a music signal.

24 Claims, 4 Drawing Sheets

U.S. PATENT DOCUMENTS

| | | | | |
|---|---|---|---|---|
| 3,673,331 | A * | 6/1972 | Hair et al. | 704/246 |
| 3,828,133 | A * | 8/1974 | Ishigami et al. | 704/205 |
| 3,855,417 | A * | 12/1974 | Fuller | 704/272 |
| 4,076,960 | A * | 2/1978 | Buss et al. | 704/200 |
| 4,424,415 | A * | 1/1984 | Lin | 704/209 |
| 4,442,540 | A * | 4/1984 | Allen | 370/484 |
| 4,457,014 | A * | 6/1984 | Bloy | 381/98 |
| 4,641,343 | A * | 2/1987 | Holland et al. | 704/276 |
| 4,959,863 | A * | 9/1990 | Azuma et al. | 704/272 |
| 5,214,708 | A * | 5/1993 | McEachern | 704/266 |
| 5,615,302 | A * | 3/1997 | McEachern | 704/209 |
| 5,809,459 | A * | 9/1998 | Bergstrom et al. | 704/223 |
| 5,828,994 | A * | 10/1998 | Covell et al. | 704/211 |
| 5,832,424 | A * | 11/1998 | Tsutsui | 704/200.1 |
| 5,870,703 | A * | 2/1999 | Oikawa et al. | 704/200.1 |
| 5,909,664 | A * | 6/1999 | Davis et al. | 704/200.1 |
| 5,950,156 | A * | 9/1999 | Ueno et al. | 704/200.1 |
| 6,140,568 | A | 10/2000 | Kohler | |
| 6,195,632 | B1 * | 2/2001 | Pearson | 704/206 |
| 6,202,046 | B1 * | 3/2001 | Oshikiri et al. | 704/233 |
| 6,266,644 | B1 * | 7/2001 | Levine | 704/503 |
| 6,275,795 | B1 * | 8/2001 | Tzirkel-Hancock | 704/214 |
| 6,301,555 | B2 * | 10/2001 | Hinderks | 704/200.1 |
| 6,413,098 | B1 * | 7/2002 | Tallal et al. | 434/185 |
| 6,646,587 | B2 * | 11/2003 | Funai | 342/26 R |
| 6,675,140 | B1 * | 1/2004 | Irino et al. | 704/203 |
| 6,751,564 | B2 * | 6/2004 | Dunthorn | 702/66 |
| 6,775,629 | B2 * | 8/2004 | Rao et al. | 702/76 |
| 6,868,365 | B2 * | 3/2005 | Balan et al. | 702/180 |
| 6,965,068 | B2 * | 11/2005 | Moriat | 84/616 |
| 7,085,721 | B1 * | 8/2006 | Kawahara et al. | 704/258 |
| 7,317,958 | B1 * | 1/2008 | Freed et al. | 700/94 |
| 2001/0044719 | A1 * | 11/2001 | Casey | 704/245 |
| 2002/0169601 | A1 * | 11/2002 | Nishio | 704/205 |
| 2003/0055630 | A1 * | 3/2003 | Byrnes et al. | 704/205 |
| 2003/0125936 | A1 * | 7/2003 | Dworzak | 704/211 |
| 2003/0182106 | A1 * | 9/2003 | Bitzer et al. | 704/207 |
| 2004/0049383 | A1 * | 3/2004 | Kato et al. | 704/226 |
| 2004/0122662 | A1 * | 6/2004 | Crockett | 704/200.1 |
| 2004/0181393 | A1 * | 9/2004 | Baumgarte | 704/200.1 |
| 2005/0137730 | A1 * | 6/2005 | Trautmann et al. | 700/94 |

FOREIGN PATENT DOCUMENTS

| | | |
|---|---|---|
| WO | WO 01/16937 A1 | 3/2001 |
| WO | 0188900 | 11/2001 |

OTHER PUBLICATIONS

Jarina, et al. "Rhythm Detection for Speech-Music Discrimination in MPEG Compressed Domain." IEEE. 2002.

Casey, M., et al. "Separation of Mixed Audio Sources by Independent Subspace Analysis." Proc. Of the Intl. Computer Music Conference. Berlin. 2000.

Fitzgerald, D., et al. "Prior Subspace Analysis for Drum Transcription." Proc. Of the 114$^{th}$ AES Convention. Amsterdam. 2003.

Fitzgerald, D., et al. "Drum Transcription in the Presence of Pitched Instruments Using Prior Subspace Analysis." Proc. Of the ISSC. Limerick, Ireland. 2003.

Orife, I. "Riddim: A Rhythm Analysis and Decomposition Tool Based on Independent Subspace Analysis." Master Thesis. Darthmouth College. Hanover, New Hampshire. 2001.

Plumbley, M. "Algorithms for Non-negative Independent Component Analysis." IEEE Transactions on Neural Networks. 14(3). pp. 534-543. May 2003.

Uhle, C., et al. "Extraction of Drum Tracks From Polyphonic Music Using Independent Subspace Analysis." Nara, Japan. 2003.

* cited by examiner

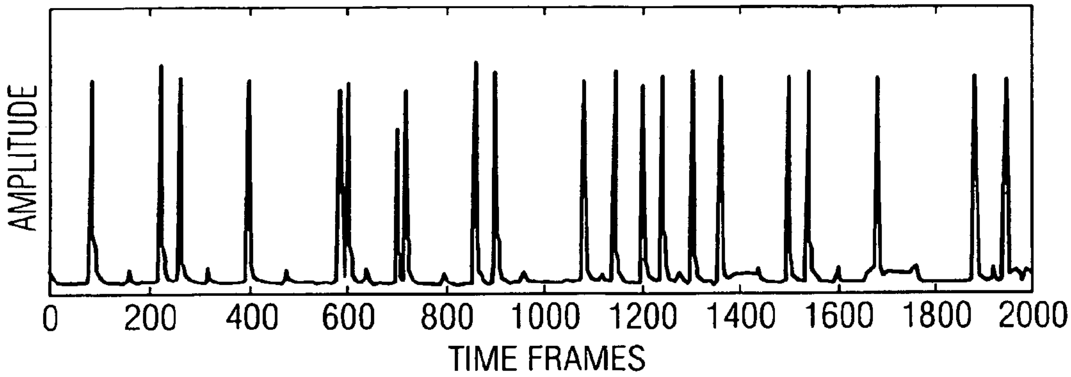
Fig. 3A AMPLITUDE ENVELOPE FOR A PERCUSSIVE SOURCE (KICK DRUM)
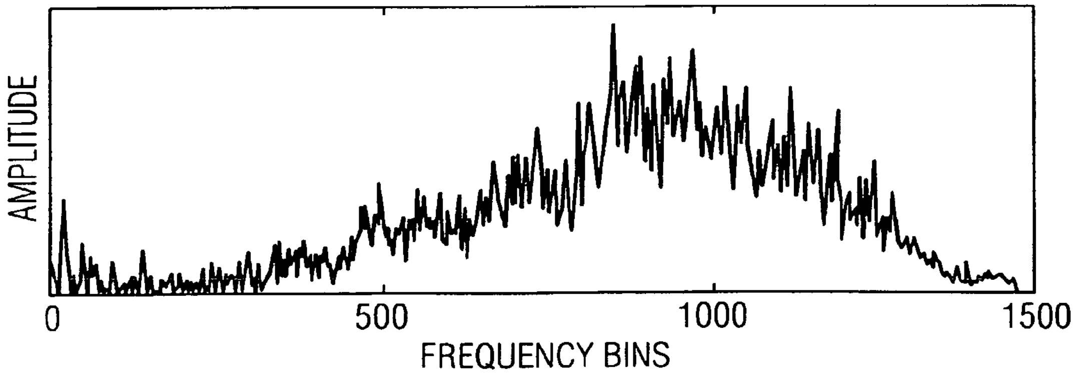
Fig. 3B PROFILE SPECTRA FOR A PERCUSSIVE SOURCE (HI-HAT)

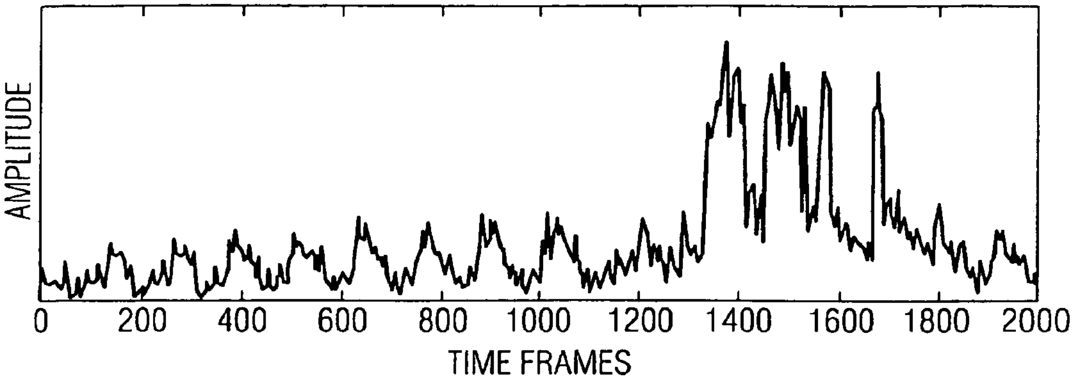
*Fig. 4A* AMPLITUDE ENVELOPE FOR A HARMONICALLY SUSTAINED INSTRUMENT (TRUMPET)
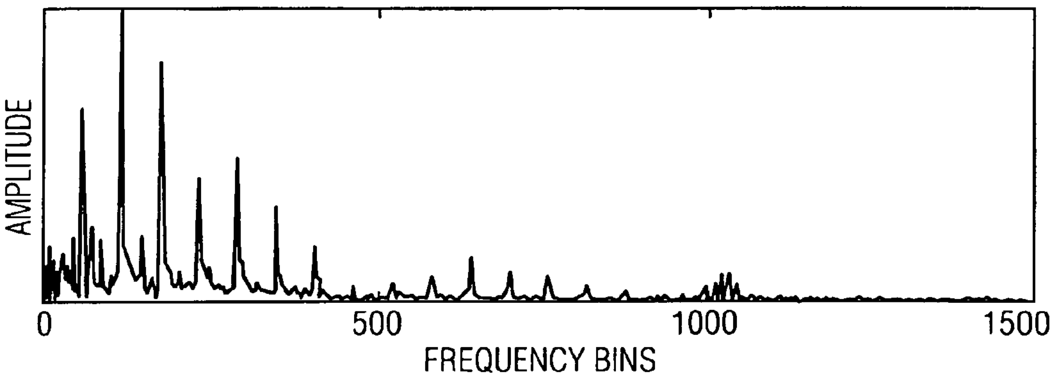
*Fig. 4B* PROFILE SPECTRA FOR A HARMONICALLY SUSTAINED INSTRUMENT (GUITAR)

DEVICE AND METHOD FOR ANALYZING AN INFORMATION SIGNAL

CROSS-REFERENCE TO RELATED APPLICATION

This application claims the benefit of U.S. Provisional Patent Application No. 60/569,423, filed on May 7, 2004, and is incorporated herein by reference in its entirety.

BACKGROUND OF THE INVENTION

1. Field of the Invention

The present invention relates to analyzing information signals, such as audio signals, and in particular to analyzing information signals consisting of a superposition of partial signals, it being possible for a partial signal to stem from an individual source or a group of individual sources.

2. Description of Prior Art

Ongoing development of digital distribution media for multi-media contents has led to a large variety of data offered. The huge variety of data offered has long exceeded the limits of manageability to human users. Thus, descriptions of the contents of the data by means of metadata become more and more important. In principle, the goal is to make it possible to search not only text files, but also e.g. music files, video files or other information signal files, while envisaging the same conveniences as with common text databases. One approach in this context is the known MPEG 7 standard.

In particular in analyzing audio signals, i.e. signals including music and/or voice, extracting fingerprints is very important.

What is also envisaged is to "enrich" audio data with metadata so as to retrieve metadata on the basis of a fingerprint, e.g. for a piece of music. The "fingerprint" is to provide a sufficient amount of relevant information, on the one hand, and is to be as short and concise as possible, on the other hand. "Fingerprint" thus designates a compressed information signal which is generated from a music signal and does not contain the metadata but serves to make reference to the metadata, e.g. by searching in a database, e.g. in a system for identifying audio material ("audioID").

Normally, music data consists of the superposition of partial signals from individual sources. While in pop music, there are typically relatively few individual sources, i.e. the singer, the guitar, the bass guitar, the drums and a keyboard, the number of sources may become very large for an orchestra piece. An orchestra piece and a piece of pop music, for example, consist of a superposition of the tones emitted by the individual instruments. Thus, an orchestra piece, or any piece of music, represents a superposition of partial signals from individual sources, the partial signals being the tones generated by the individual instruments of the orchestra and/or pop music formation, and the individual instruments being individual sources.

Alternatively, even groups of original sources may be regarded as individual sources, so that one signal may be assigned at least two individual sources.

An analysis of a general information signal will be presented below, by way of example only, with reference to an orchestra signal. Analysis of an orchestra signal may be performed in a variety of ways. For example, there may be a desire to recognize the individual instruments and to extract the individual signals of the instruments from the overall signal, and to possibly translate them into musical notation, in which case the musical notation would act as "metadata". Other possibilities of analysis are to extract a dominant rhythm, it being easier to extract rhythms on the basis of the percussion instruments rather than on the basis of instruments which rather produce tones, also referred to as harmonically sustained instruments. While percussion instruments typically include kettledrums, drums, rattles or other percussion instruments, the harmonically sustained instruments include all other instruments, such as violins, wind instruments, etc.

In addition, percussion instruments include all those acoustic or synthetic sound producers which contribute to the rhythm section on the ground of their sound properties. (e.g. rhythm guitar).

Thus, it would be desirable, for example for rhythm extraction in a piece of music, to extract only percussive portions from the entire piece of music, and to then perform rhythm detection on the basis of these percussive portions without "interfering with" the rhythm detection by signals coming from the harmonically sustained instruments.

On the other hand, any analysis pursuing the goal of extracting metadata which requires exclusively information about the harmonically sustained instruments (e.g. a harmonic or melodic analysis) will benefit from an upstream separation and of further processing of the harmonically sustained portions.

Very recently, there have been reports, in this context, about the utilization of blind source separation (BSS) and independent component analysis (ICA) techniques for signal processing and signal analysis. Fields of applications are, in particular, biomedical technology, communication technology, artificial intelligence and image processing.

Generally, the term BSS includes techniques for separating signals from a mix of signals with a minimum of previous experience with or knowledge of the nature of signals and the mixing process. ICA is a method based on the assumption that the sources underlying a mix are statistically independent of each other at least to a certain degree. In addition, the mixing process is assumed to be invariable in time, and the number of the mixed signals is assumed to be no smaller than the number of the source signals underlying the mix.

Independent subspace analysis (ISA) represents an expansion of ICA. With ISA, the components are subdivided into independent subspaces, the components of which need not be statistically independent. By transforming the music signal, a multi-dimensional representation of the mixed signal is determined, and the latter assumption for the ICA is met. In the last few years, various methods of calculating the independent components have been developed. What follows is relevant literature also dealing, in part, with analyzing audio signals:

[1] M. A. Casey and A. Westner, "Separation of Mixed Audio Sources by Independent Subspace Analysis", in Proc. of the International Computer Music Conference, Berlin, 2000

[2] I. F. O. Orife, "Riddim: A rhythm analysis and decomposition tool based on independent subspace analysis", Master thesis, Darthmouth College, Hanover, N.H., 2001

[3] C. Uhle, C. Dittmar and T. Sporer, "Extraction of Drum Tracks from polyphonic Music using Independent Subspace Analysis", in Proc. of the Fourth International Symposium on Independent Component Analysis, Nara, Japan 2003

[4] D. Fitzgerald, B. Lawlor and E. Coyle, "Prior Subspace Analysis for Drum Transcription", in Proc. of the 114th AES Convention, Amsterdam, 2003

[5] D. Fitzgerald, B. Lawlor and E. Coyle, "Drum Transcription in the presence of pitched instruments using Prior Subspace Analysis", in Proc. of the ISSC, Limerick, Ireland, 2003

[6] M. Plumbley, "Algorithms for Non-Negative Independent Component Analysis", in IEEE Transactions on Neural Networks, 14 (3), pp 534 -543, May 2003

In [1], a method of separating individual sources of mono audio signals is represented. [2] gives an application for a subdivision into single traces, and, subsequently, rhythm analysis. In [3], a component analysis is performed to achieve a subdivision into percussive and non-percussive sounds of a polyphonic piece. In [4], independent component analysis (ICA) is applied to amplitude bases obtained from a spectrogram representation of a drum trace by means of generally calculated frequency bases. This is performed for transcription purposes. In [5], this method is expanded to include polyphonic pieces of music.

The first above-mentioned publication by Casey will be represented below as an example of the prior art. Said publication describes a method of separating mixed audio sources by the technique of independent subspace analysis. This involves splitting up an audio signal into individual component signals using BSS techniques. To determine which of the individual component signals belong to a multi-component subspace, grouping is performed to the effect that the components' mutual similarity is represented by a so-called ixegram. The ixegram is referred to as a cross-entropy matrix of the independent components. It is calculated in that all individual component signals are examined, in pairs, in a correlation calculation to find a measure of the mutual similarity of two components. Thus, exhaustive pair-wise similarity calculations are performed across all component signals, so that what results is a similarity matrix in which all component signals are plotted along a y axis, and in which all component signals are also plotted along the x axis. This two-dimensional array provides, for each component signal, a measure of similarity with one other component signal, respectively. The ixegram, i.e. the two-dimensional matrix, is now used to perform clustering, for which purpose grouping is performed using a cluster algorithm on the basis of dyadic data. To perform optimum partitioning of the ixegram into k categories, a cost function is defined which measures the compactness within a cluster and determines the homogeneity between clusters. The cost function is minimized, so that what eventually results is an allocation of individual components to individual subspaces. If this is applied to a signal which represents a speaker in the context of a continual roaring of a waterfall, what results as the subspace is the speaker, the reconstructed information signal of the speaker subspace exhibiting significant attenuation of the roaring of the waterfall.

What is disadvantageous about the concepts described is the fact that the case where the signal portions of a source will come to lie on different component signals is very likely. This is the reason why, as has been described above, a complex and computing-time-intensive similarity calculation is performed among all component signals to obtain the two-dimensional similarity matrix, on the basis of which a classification of component signals into subspaces will eventually be performed by means of a cost function to be minimized.

What is also disadvantageous is the fact that in the case where there are several individual sources, i.e. where the output signal is not known upfront, even though there will be a similarity distribution after a longish calculation, the similarity distribution itself does not give an actual idea of the actual audio scene. Thus, the viewer knows merely that certain component signals are similar to one another with regard to the minimized cost function. However, he/she does not know which information is contained in these subspaces, which were eventually obtained, and/or which original individual source or which group of individual sources are represented by a subspace.

Independent subspace analysis (ISA) may therefore be exploited to decompose a time-frequency representation, i.e. a spectrogram, of an audio signal into independent component spectra. To this end, the above-described prior methods rely either on a computationally intensive determination of frequency and amplitude bases from the entire spectrogram, or on frequency bases defined upfront. Such frequency bases and/or profile spectra defined upfront consist, for example, in that a piece is said to be very likely to feature a trumpet, and that an exemplary spectrum of a trumpet will then be used for signal analysis.

This procedure has the disadvantage that one has to know all featuring instruments upfront, which goes against, in principle already, to automated processing. A further disadvantage is that, if one wants to operate in a meticulous manner, there are, for example, not only trumpets, but many different kinds of trumpets, all of which differ in terms of their qualities of sound, or timbres, and thus in their spectra. If the approach were to employ all types of exemplary spectra for component analysis, the method again becomes very time-consuming and expensive and gets to exhibit a very high redundancy, since typically not all feasible different kinds of trumpets will feature in one piece, but only trumpets of one single kind, i.e. with one single profile spectrum, or perhaps with very few different timbres, i.e. with few profile spectra. The problem gets worse when it comes to different notes of a trumpet, especially as each tone comprises a spread/contracted profile spectrum, depending on the pitch. Taking this into account also involves a huge computational expenditure.

On the other hand, decomposition on the basis of ISA concepts becomes extremely computationally intensive and susceptible to interference if the entire spectrogram is used. It shall be pointed out that a spectrogram typically consists of a series of individual spectra, a hopping time period being defined between the individual spectra, and a spectrum representing a specific number of samples, so that a spectrum has a specific time duration, i.e. a block of samples of the signal, associated with it. Typically, the duration represented by the block of samples from which a spectrum is calculated is considerably longer than the hopping time so as to obtain a satisfactory spectrogram with regard to the frequency resolution required and with regard to the time resolution required. However, on the other hand it may be seen that this spectrogram representation is extraordinarily redundant. If one considers the case, for example, that a hopping time duration amounts to 10 ms and that a spectrum is based on a block of samples having a time duration of, e.g., 100 ms, every sample will come up in 10 consecutive spectra. The redundancy thus created may cause the requirements in terms of computing time to reach astronomical heights especially if a relatively large number of instruments are searched for.

In addition, the approach of working on the basis of the entire spectrogram is disadvantageous for such cases where not all sources contained are to be extracted from a signal, but where, for example, only sources of a specific kind, i.e. sources having a specific characteristic, are to be extracted. Such a characteristic may relate to percussive sources, i.e. percussion instruments, or to so-called pitched instruments, also referred to as harmonically sustained instruments, which are typical instruments of tune, such as trumpet, violin, etc. A method operating on the basis of all these sources will then be too time-consuming and expensive and, after all, also not robust enough if, for example, only some sources, i.e. those sources which are to meet a specific characteristic, are to be extracted. In this case, individual spectra of the spectrogram, wherein such sources do not occur or occur only to a very small extent, will corrupt, or "blur" the overall result, since these spectra of the spectrogram are self-evidently included into the eventual component analysis calculation just as much as the significant spectra.

SUMMARY OF THE INVENTION

It is an object of the present invention to provide a robust and computing-time-efficient concept for analyzing an information signal.

In accordance with a first aspect, the invention provides a device for analyzing an information signal, having:

an extractor for extracting significant short-time spectra or significant short-time spectra derived from short-time spectra of the information signal, from the information signal, the extractor being configured to extract such short-time spectra which come closer to a specific characteristic than other short-time spectra of the information signal;

a decomposer for decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought for; and a calculator for calculating an amplitude envelope for the tone sources, an amplitude envelope for a tone source indicating how a profile spectrum of the tone source changes over time, using the profile spectra and a sequence of short-time spectra representing the information signal.

In accordance with a second aspect, the invention provides a method for analyzing an information signal, the method including the steps of:

extracting significant short-time spectra or significant short-time spectra derived from short-time spectra of the information signal, from the information signal, the short-time spectra extracted being such short-time spectra which come closer to a specific characteristic than other short-time spectra of the information signal;

decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought for; and calculating an amplitude envelope for the tone sources, an amplitude envelope for a tone source indicating how a profile spectrum of the tone source changes over time, using the profile spectra and a sequence of short-time spectra representing the information signal.

In accordance with a third aspect, the invention provides a computer program having a program code for performing the method for analyzing an information signal, the method including the steps of:

extracting significant short-time spectra or significant short-time spectra derived from short-time spectra of the information signal, from the information signal, the short-time spectra extracted being such short-time spectra which come closer to a specific characteristic than other short-time spectra of the information signal;

decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought for; and calculating an amplitude envelope for the tone sources, an amplitude envelope for a tone source indicating how a profile spectrum of the tone source changes over time, using the profile spectra and a sequence of short-time spectra representing the information signal, when the computer program runs on a computer.

The present invention is based on the findings that robust and efficient information-signal analysis is achieved by initially extracting significant short-time spectra or short-time spectra derived from significant short-period spectra, such as difference spectra etc., from the entire information signal and/or from the spectrogram of the information signal, the short-period spectra extracted being such short-time spectra which come closer to a specific characteristic than other short-time spectra of the information signal.

What is preferably extracted are short-time spectra which have percussive portions, and consequently, short-time spectra which have harmonic portions will not be extracted. In this case, the specific characteristic is a percussive, or drum, characteristic.

The short-period spectra extracted or short-period spectra derived from the short-period spectra extracted are then fed to a means for decomposing the short-period spectra into component-signal spectra, a component-signal spectrum representing a profile spectrum of a tone source which generates a tone corresponding to the characteristic sought for, and another component-signal spectrum representing another profile spectrum of a tone source which generates a tone also corresponding to the characteristic sought for.

Eventually, an amplitude envelope is calculated over time on the basis of the profile spectra of the tone sources, the profile spectra determined as well as the original short-time spectra being used for calculating the amplitude envelope over time, so that for each point in time, at which a short-time spectrum was taken, an amplitude value is obtained as well.

The information thus obtained, i.e. various profile spectra as well as amplitude envelopes for the profile spectra, thus provides a comprehensive description of the music and/or information signal with regard to the specified characteristic with regard to which the extraction has been performed, so that this information may already be sufficient for performing a transcription, i.e. for initially establishing, with concepts of feature extraction and segmenting, which instrument "belongs to" the profile spectrum and which rhythmics are at hand, i.e. which are the events of rise and fall which indicate notes of this instrument that are played at specific points in time.

The present invention is advantageous in that rather than the entire spectrogram, only extracted short-time spectra are used for calculating the component analysis, i.e. for decomposing, so that the calculation of the independent subspace analysis (ISA) is performed only using a subset of all spectra, so that computing requirements are lowered. In addition, the robustness with regard to finding specific-sources sources is also increased, particularly as other short-time spectra which do not meet the specified characteristic are not present in the component analysis and therefore do not represent any interference and/or "blurring" of the actual spectra.

In addition, the inventive concept is advantageous in that the profile spectra are determined directly from the signal without this resulting in the problems of the ready-made profile spectra, which again would lead to either inaccurate results or to increased computational expenditure.

Preferably, the inventive concept is employed for detecting and classifying percussive, non-harmonic instruments in polyphonic audio signals, so as to obtain both profile spectra and amplitude envelopes for the individual profile spectra.

BRIEF DESCRIPTION OF THE DRAWINGS

Preferred embodiments of the present invention will be explained below in detail with regard to the accompanying figures, wherein:

FIG. 3*a* shows an example of an amplitude envelope for a percussive source;

FIG. 3*b* shows an example of a profile spectrum for a percussive source;

FIG. 4*a* shows an example of an amplitude envelope for a harmonically sustained instrument; and FIG. 4*b* shows an example of a profile spectrum for a harmonically sustained instrument.

DESCRIPTION OF PREFERRED EMBODIMENTS

Figure 1:
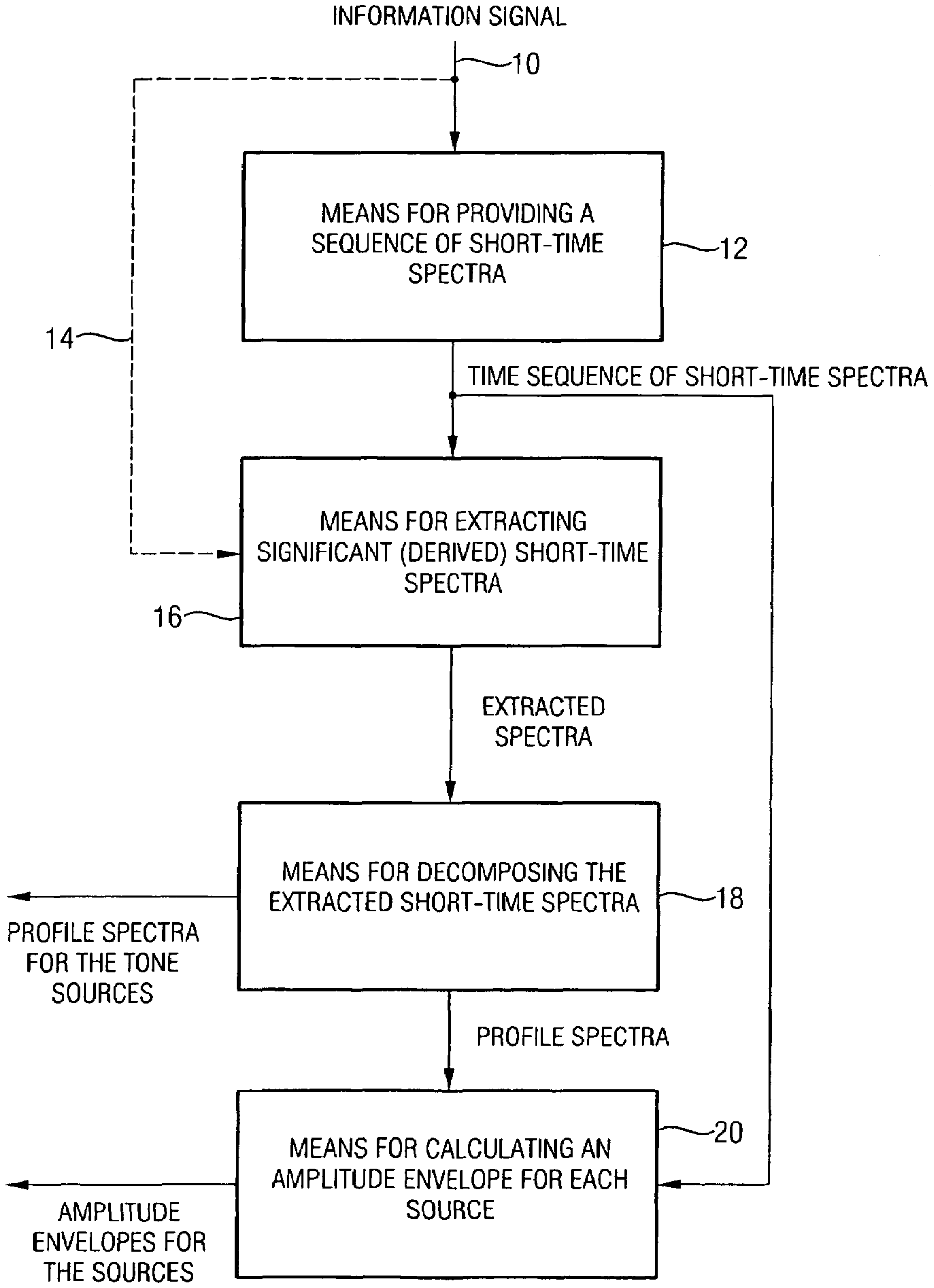
FIG. 1 shows a block diagram of the inventive device for analyzing an information signal.

FIG. 1 shows a preferred embodiment of an inventive device for analyzing an information signal which is fed via an input line 10 to means 12 for providing a sequence of short-time spectra which represent the information signal. As is depicted by an alternate routing 14 in FIG. 1, which is drawn in dashed lines, the information signal may also be fed, e.g. in a temporal form, to means 16 for extracting significant short-time spectra, or short-time spectra which are derived from the short-time spectra, from the information signal, the means for extracting being configured to extract such short-time spectra which come closer to a specific characteristic than other short-time spectra of the information signal.

The extracted spectra, i.e. the original short-time spectra or the short-time spectra derived from the original short-time spectra, for example by differentiating, differentiating and rectifying, or by means of other operations, are fed to means 18 for decomposing the extracted short-time spectra into component signal spectra, one component signal spectrum representing a profile spectrum of a tone source which generates a tone corresponding to the characteristic sought for, and another profile spectrum representing another tone source which generates a tone also corresponding to the characteristic sought for.

The profile spectra are eventually fed to means 20 for calculating an amplitude envelope for the one tone source, the amplitude envelope indicating how the profile spectra of a tone source change over time and, in particular, how the intensity, or weighting, of a profile spectrum changes over time. Means 20 is configured to function on the basis of the sequence of short-time spectra, on the one hand, and on the basis of the short-period spectra, on the other hand, as may be seen from FIG. 1. On the output side, means 20 for calculating provides amplitude envelopes for the sources, whereas means 18 provides profile spectra for the tone sources. The profile spectra as well as the associated amplitude envelopes provide a comprehensive description of that portion of the information signal which corresponds to the specific characteristic. Preferably, this portion is the percussive portion of a piece of music. Alternatively, however, this portion could also be the harmonic portion. In this case, the means for extracting significant short-time spectra would be configured differently from the case where the specific characteristic is a percussive characteristic.

Figure 2:
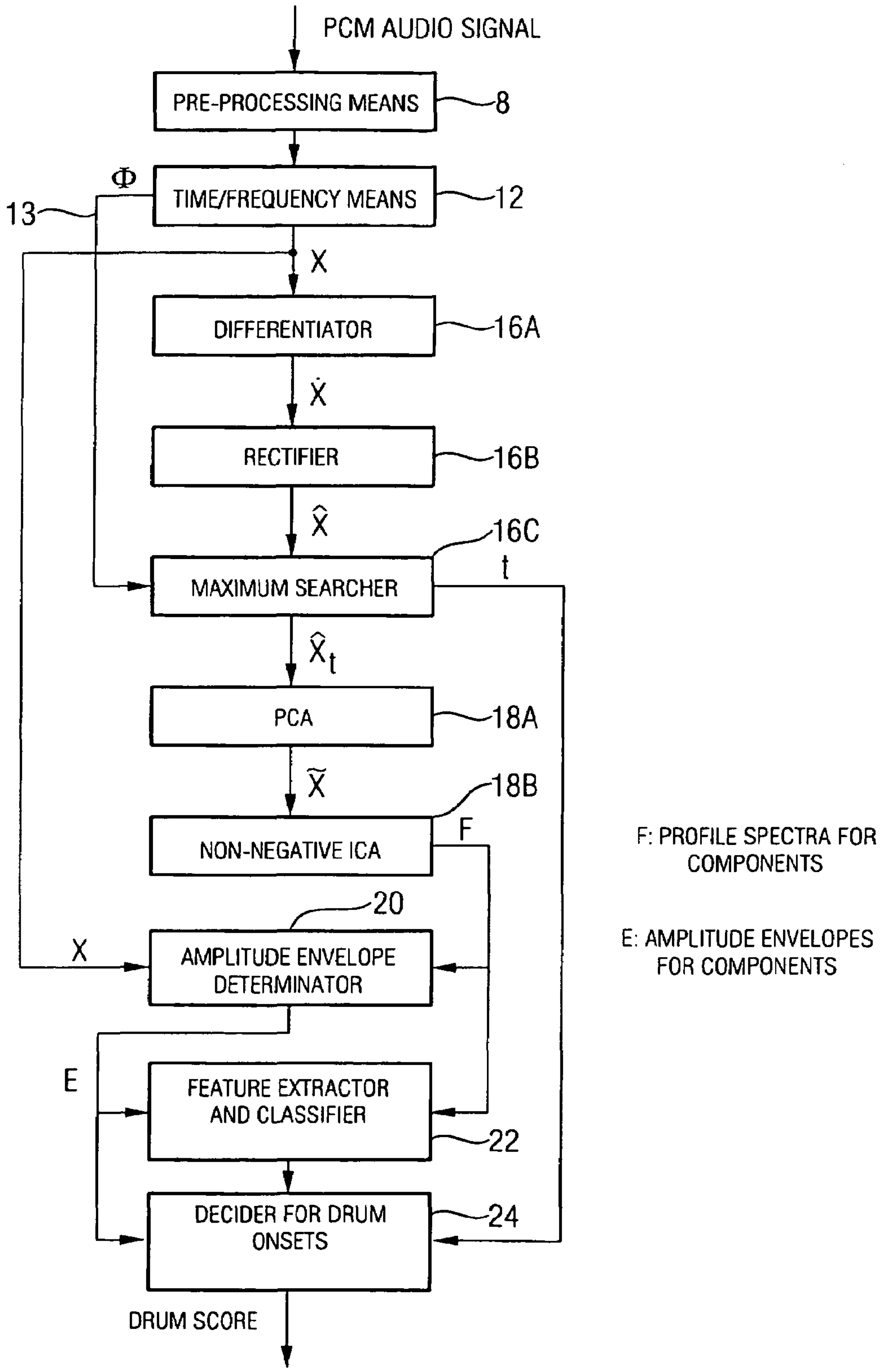
FIG. 2 shows a block diagram of a preferred embodiment of the inventive device for analyzing an information signal.

With reference to FIG. 2, a preferred embodiment of the present invention will be represented below. Preferably, detection and classification of percussive, non-harmonic instruments are performed with profile spectra F and amplitude envelopes E, as is also depicted by block 22 in FIG. 2. However, this will be discussed in more detail later on.

As may be seen from FIG. 2, means 12 for providing: a sequence of short-time spectra is configured to generate an amplitude spectrogram X by means of a suitable time/frequency transformation. The time/frequency means 12 is preferably a means for performing a short-time Fourier transform with a specific hopping period, or includes filter banks. Optionally, a phase spectrogram is also obtained as an additional source of information, as is depicted in FIG. 2 by a phase arrow 13. Subsequently, a difference spectrogram $\dot{X}$, as is depicted by differentiator 16*a*, is obtained by performing a differentiation along the temporal expansion of each individual spectrogram row, i.e. of each-individual frequency bin. The negative portions arising from the differentiation are set to zero, or, alternatively, are made positive. This results in a non-negative difference spectrogram $\hat{X}$. This non-negative difference spectrogram is fed to a maximum searcher 16*c* configured to search for points in time t, i.e. for the indices of the respective spectrogram columns, of the occurrence of local maxima in a detection function e, which is calculated prior to maximum searcher 16*c*. As will be explained later on, the detection function may be obtained, for example, by summing up across all rows of $\hat{X}$ and by subsequent smoothing.

Optionally, it is preferred to use the phase information, which is provided from block 12 to block 16*c* via phase line 13, as an indicator for the reliability of the maxima found. The spectra for which the maximum searcher detects a maximum in the detection function are used as $\hat{X}_t$ and represent the short-time spectra extracted.

In block 18*a*, a principal component analysis (PCA) is performed. For this purpose, a sought-for number of components d is initially specified. Thereafter, PCA is performed in accordance with a suitable method, such as singular value decomposition or eigenvalue decomposition, across the columns of matrix $\hat{X}_t$.

$$\tilde{X}=\hat{X}_t\cdot T$$

The transformation matrix T causes a dimension reduction with regard to $\tilde{X}$, which results in a reduction of the number of columns of this matrix. In addition, a decorrelation and variance normalization are achieved. In block 18*b*, a non-negative independent component analysis is then performed. For this purpose, the method, shown in [6], of non-negative independent component analysis is performed with regard to $\tilde{X}$ for calculating a separation matrix A. In accordance with the equation below, $\tilde{X}$ is decomposed into independent components.

$$F=A\cdot\tilde{X}$$

Independent components F are interpreted as static spectral profiles, or profile spectra, of the sound sources present. In a block 20, the amplitude basis, or amplitude envelope E, is then extracted for the individual tone sources in accordance with the following equation.

$$E=F\cdot X$$

The amplitude basis is interpreted as a set of time-variable amplitude envelopes of the corresponding spectral profiles.

In accordance with the invention, the spectral profile is obtained from the music signal itself. Hereby, the computational complexity is reduced in comparison with the previous methods, and increased robustness towards stationary signal portions, i.e. signal portions due to harmonically sustained instruments, is achieved.

In a block 22, a feature extraction and a classification operation are then performed. In particular, the components are distinguished into two subsets, i.e. initially into a subset having the properties "non-percussive", i.e. harmonic, as it were, and into another, percussive subset. In addition, the components having the property "percussive/dissonant" are classified further into various classes of instruments.

For classification into the two subsets, the features of percussivity, or spectral dissonance, are used.

The following features are employed for classifying instruments:

smoothened version of the spectral profiles as a search pattern in a training database with profiles of individual instruments, spectral centroid, spectral distribution, spectral skewness, center frequencies, intensities, expansion, skewness of the clearest partial lines, . . .

Classification may be performed into the following classes of instruments, for example:

kick drum, snare drum, hi-hat, cymbal, tom, bongo, conga, woodblock, cowbell, timbales, shaker, tabla, tambourine, triangle, daburka, castagnets, handclaps.

For increasing the robustness of the inventive concept even further, a decision for using percussion onsets and/or an acceptance of percussive maxima may be performed in a block 24. Thus, maxima with a transient rise in the amplitude envelope above a variable threshold value are considered percussive events, whereas maxima with a transient rise below the variable threshold value are discarded, or recognized as artifacts and ignored. The variable threshold value preferably varies with the overall amplitude in a relatively large range around the maximum. Output is performed in a suitable form which associates the point of time of percussive events with a class of instruments, an intensity and, possibly, further information such as, for example, note and/or rhythm information in a MIDI format.

It shall be pointed out here that means 16 for extracting significant short-time spectra may be configured to perform this extraction using actual short-time spectra such as are obtained, for example, with a short-time Fourier transform. In particular with the example of application of the present invention, wherein the specific characteristic is the percussive characteristic, it is preferred not to extract actual short-time spectra but short-time spectra from a differentiated spectrogram, i.e. from difference spectra. The differentiation as is shown in block 16*a* in FIG. 2 leads the sequence of short-time spectra to a sequence of derived and/or differentiated spectra, each (differentiated) short-time spectrum now containing the changes occurring between an original spectrum and the next spectrum. Thus, stationary portions in a signal, i.e., for example, signal portions due to harmonically sustained instruments, are eliminated in a robust and reliable manner. This is due to the fact that the differentiation accentuates changes in the signal and suppresses identical portions. However, percussive instruments are characterized in that the tones produced by these instruments are highly transient with regard to their course in time.

In addition, it is preferred to perform PCA 18*a* and non-negative ICA 18*b*, i.e., more generally speaking, the decomposition operations for decomposing the extracted short-time spectra in block 18 of FIG. 1 with the derived short-time spectra rather than the original short-time spectra. This exploits the effect that for very highly transient signals, the differentiated signal is very similar to the original signal prior to differentiation, which is particularly true if there are very rapid changes in a signal. This applies to percussive instruments.

In addition, it shall be pointed out that means 18 for decomposing, which performs a PCA 18*a* with a subsequent non-negative ICA (18*b*), anyhow performs a weighted linear compensation of the extracted spectra provided by the means, for determining a profile spectrum. This means that specific weighting factors calculated by the individual methods are applied to the spectra extracted, or that the spectra extracted are linearly combined, i.e. by subtraction or addition. Therefore, one can observe, at least partially, the effect that for depositing the short-time spectra extracted, means 18 may have a functionality which counteracts differentiation, so that the profile spectra determined for the tone sources are not differentiated profile spectra, but are the actual profile spectra. In any case, one has found that using differentiated spectra, i.e. difference spectra from a difference spectrogram in combination with a decomposition algorithm—the decomposition algorithm being based on a weighted linear combination of the individual spectra extracted—leads to profile spectra for the individual high-quality and high-selectivity tone sources in means 18.

If, on the other hand, only stationary portions were processed further, i.e. if the specific characteristic is not a percussive, but a harmonic characteristic, it is preferred to achieve pre-processing of the spectrogram by integration, i.e. by summing up, so as to reinforce the stationary portions as compared to the transient portions. In this case, too, it is preferred to calculate the profile spectra for the individual—in this case harmonic—tone sources using the sum spectra, i.e. the integrated spectrogram.

Individual functionalities of the inventive concept will be presented in more detail below. However, in a preferred embodiment of the present invention, typical digital audio signals are initially pre-processed by means 8. In addition, it is preferred to add, as a PCM audio signal input into pre-processing means 8, mono files having a width of 16 bits per sample at a sampling frequency of 44.1 Hz. These audio signals, i.e. this stream of audio samples, which may also be a stream of video samples and may generally be a stream of information samples, is fed to pre-processing means 8 so as to perform pre-processing within the time range using a software-based emulation of an acoustic-effect device often referred to as "exciter". With this concept, the pre-processing stage 8 amplifies the high-frequency portion of the audio signal. This is achieved by performing a non-linear distortion with a high-pass filtered version of the signal, and by adding the result of the distortion to the original signal. It turns out that this pre-processing is particularly favorable when there are hi-hats to be evaluated, or idiophones with a similarly high pitch and low intensity. Their energetic weight in relation to the overall music signal is increased by this step, whereas most harmonically sustained instruments and percussion instruments having lower tones are not negatively affected.

Another positive side effect is the fact that MP3 encoded and decoded files which have been inherently low-pass filtered by this process, again obtain high-frequency information.

A spectral representation of the pre-processed time signal is then obtained using the time/frequency means 12, which preferably performs a short-time Fourier transform (STFT).

To implement the time/frequency means, a relatively large block size of preferably 4096 values, and a high degree of overlap are preferred. What is initially required is a good spectral resolution for the low-frequency range, i.e. for the lower spectral coefficient. In addition, the temporal resolution is increased to a desired accuracy by obtaining a hop size, i.e. a small hop interval between adjacent blocks. In the preferred embodiment, as has already been explained, 4096 samples per block are subject to a short-time Fourier transform, which corresponds to a temporal block duration of 92 ms. This means that each sample comes up more than 9 times in a row within a short-time spectrum.

Means 12 is configured to obtain an amplitude spectrum X. The phase information may also be calculated, and, as will be explained in more detail below, may be used in the extreme-value searcher, or maximum searcher, 16*c*.

The amount spectrum X now possesses n frequency bins or frequency coefficients, and m columns and/or frames, i.e. individual short-time spectra. The time-variable changes of each spectral coefficient are differentiated across all frames and/or individual spectra, specifically by differentiator 16*a*, to decimate the influence of harmonically sustained tone sources and to simplify subsequent detection of transients. The differentiation, which preferably comprises the formation of a difference between two short-time spectra of the sequence, may also exhibit certain normalizations.

It shall be pointed out that differentiation may lead to negative values, so that half-wave rectification is performed in a block 16*b* to eliminate this effect. Alternatively, however, the negative signs could simply be reversed, which is not preferred, however, with a view to the subsequent decomposition of components.

Because of the rectifier 16*b*, a non-negative difference spectrogram is thus obtained which is fed to maximum searcher 16*c*.

Maximum searcher 16*c* performs an event detection which will be dealt with below. The detection of several local extreme values and preferably of local maxima associated with transient onset events in the music signal is performed by initially defining a time tolerance which separates two consecutive drum onsets. In the preferred embodiment a time period of 68 ms is used as a constant value derived from time resolution and from knowledge about the music signal. In particular, this value determines the number of frames and/or individual spectra and/or differentiated individual spectra which must occur at least between two consecutive onsets. Use of this minimum distance is also supported by the consideration that at an upper speed limit of a very high speed of 250 bpm, a sixteenth of a note lasts 60 ms.

To be able to perform automated maximum search, a detection function, on the basis of which the maximum search may be performed, is derived from the differentiated and rectified spectrum, i.e. from the sequence of rectified (different) short-time spectra. In order to obtain, for each point in time, a value of this function, what is done is to simply determine a sum across all frequency coefficients and/or all spectral bins. To smooth this one-dimensional function, which will then result, over time, the function obtained is folded with a suitable Hann window, so that a relatively smooth function e is obtained. To obtain the positions t of the maxima, a sliding window having the tolerance length is "pushed" across the entire distance e to achieve the ability to obtain one maximum per step.

The reliability of the search for maxima is improved by the fact that preferably only those maxima are maintained which appear in a window for more than a moment, since they are very likely to be the interesting peaks. Thus it is preferred to use those maxima which represent a maximum over a predetermined threshold of moments, i.e., for example, three moments, the threshold eventually depending on the ratio of the block duration and the hop size. This goes to show that a maximum, if it really is a significant maximum, must be a maximum for a certain number of moments, i.e., eventually, for a certain number of overlapping spectra, if one considers the fact that with the numerical values represented above, each sample "is in on" at least 9 consecutive short-time spectra.

In the preferred embodiment of the present invention, the "unwrapped" phase information of the original spectrogram are used as a reliability function, as is depicted by the phase arrow. It turned out that a significant, positively directed phase shift needs to occur in addition to an estimated onset time t, which avoids that small ripples are erroneously regarded as onsets.

In accordance with the invention, a small portion of the difference spectrogram, specifically a short-time spectrum formed by differentiation, is extracted and fed to the subsequent decomposition means.

Subsequently, the functionality of means 18*a* for performing a principal component analysis will be addressed. From the steps described in the above paragraph, the information about the time of occurrence t and the spectral compositions of the onsets, i.e. the extracted short-time spectra $X_t$, are thus derived. With real music signals, one typically finds a large number of transient events within the duration of the piece of music. Even with a simple example of a piece having a speed of 120 beats per minute (bpm) it turns out that 480 events may occur in a four-minute extract, provided that only quarter notes occur. As to the goal of finding only a few significant subspaces and/or profile spectra, principal component analysis (PCA) is applied to $\hat{X}_t$, i.e. to the short-time spectra extracted or to short-time spectra derived from the short-time spectra extracted.

Using this known technique it is possible to reduce the entire set of short-time spectra collected to a limited number of decorrelated principal components, which results in a positive representation of the original data with a small reconstruction error. To this end, an eigenvalue decomposition (EVD) of the covariance matrix of the data set is calculated. From the set of eigenvectors, those eigenvectors having the d largest eigenvalues are selected so as to provide the coefficients for the linear combination of the original vectors in accordance with the following equation:

$$\tilde{X}=\hat{X}_t\cdot T$$

Therefore, T describes a transformation matrix, which is actually a subset of the multiplicity of the eigenvectors. In addition, the reciprocal values of the eigenvalues are used as scaling factors, which not only leads to a decorrelation, but also provides variance normalization, which again results in a whitening effect. Alternatively, a singular value decomposition (SVD) of $\hat{X}_t$ may also be used. One has found that SVD is equivalent to PCA with EVD. The-whitened components $\tilde{X}$ are subsequently fed into ICA stage 18*b*, which will be dealt with below.

Generally speaking, independent component analysis (ICA) is a technique used to decompose a set of linear mixed signals into their original sources or component signals. One requirement placed upon optimum behavior of the algorithm is the sources' statistical independence. Preferably, non-negative ICA is used which is based on the intuitive concept of optimizing a cost function describing the non-negativity of the components. This cost function is related to a reconstruction error introduced by pair-of-axes rottions of two or more variables in the positive quadrant of the common probability density function (PDF). The assumptions for this model imply that the original source signals are positive, and, at zero, have a PDF different from zero, and that they are linearly independent up to a certain degree. The first concept is always satisfied, since the vectors subject to ICA result from the differentiated and half-wave weighted version $\hat{X}$ of the original spectrogram X, which version thus will never include values smaller than zero, but will certainly include values equaling zero. The second limitation is taken into account if the spectra collected at times of onset are regarded as the linear combinations of a small set of original source spectra characterizing the instruments in question. Of course, this means a rather rough approximation, which, however, proves to be sufficient in most cases.

In addition, use is made of the fact that the spectra which have onsets, particularly the spectra of actual percussion instruments, have no invariant structures, but are not subject to any changes here with regard to their spectral compositions. Nevertheless, it may be assumed that there are characteristic properties which are characteristic of spectral profiles of percussive tones and which thus allow the whitened components $\tilde{X}$ to be separated into their potential source and profile spectra F, respectively, in accordance with the following equation.

$$F=A\cdot\tilde{X}$$

A designates a d×d de-mixing matrix determined by the ICA process which actually separates the individual components $\tilde{X}$. The sources F are also referred to as profile spectra in this document. Each profile spectrum has n frequency bins, just like a spectrum of the original spectrogram, but is identical for all times—except for amplitude normalization, i.e. the amplitude envelope. This means that such a profile spectrum only contains that spectral information which is related to an onset spectrum of an instrument. In order to preferably circumvent arbitrary scaling of the components introduced by PCA and ICA, a transformation matrix R is used in accordance with the following equation:

$$R=T\cdot A^T$$

Normalizing R with its absolute maximum value results in weighting coefficients in a range from −1 to +1, so that spectral profiles extracted using the following equation $$F=\hat{X}_t\cdot R$$

have values in the range of the original spectrogram. Further normalization is achieved by dividing each spectral profile by its L2 norm.

As has already been set forth above, the assumption of independence and the assumption of invariance is not always satisfied one hundred percent for given short-time spectra. Therefore, it comes as no surprise that the spectral profiles obtained after de-mixing still exhibit certain dependencies. However, this should not be regarded as defective behavior. Tests conducted with spectral profiles of individual percussive tones have revealed that the spectral profiles also exhibit a large amount of dependence between the onset spectra of different percussive instruments. One possibility of measuring the degree of mutual overlap and similarity along the frequency axis is to conduct crosstalk measurements. For reasons of illustration, the spectral profiles obtained from the ICA process may be regarded as a transfer function of highly frequency-selective parts in a filter bank, it being possible for passage bands to lead to crosstalk in the output of the filter bank channels. The crosstalk measure present between two spectral profiles is calculated in accordance with the following equation:

$$C_{i,j}=\frac{F_i\cdot F_j^T}{F_i\cdot F_i^T}$$

In the above equation, i ranges from 1 to d, j ranges from 1 to d, and j is different from i. In fact, this value is related to the well-known cross-correlation coefficient, but the latter uses a different normalization.

On the basis of the profile spectra determined, an amplitude-envelope determination is now performed in block 20 of FIG. 2. To this end, the original spectrogram, i.e. the sequence of, e.g., short-time spectra obtained by means 12 of FIG. 1 or in time/frequency converter 12 of FIG. 2, is used. The following equation applies:

$$E=F\cdot X$$

As the second information source, the differentiated version of the amplitude envelopes may also be determined, in accordance with the following equation, from the difference spectrogram:

$$\hat{E}=F\cdot\hat{X}$$

What is essential about this concept is that no further ICA calculation is performed with the amplitude envelopes. Instead, the inventive concept provides highly specialized-spectral profiles which come very close to the spectra of those instruments which actually come up in the signal. Nevertheless, it is only in specific cases that the extracted amplitude envelopes are fine detection functions with sharp peaks, e.g. for dance-oriented music with highly dominant percussive rhythm portions. The amplitude envelopes often contain relatively small peaks and plateaus which may be due to the above-mentioned crosstalk effects.

A more detailed implementation of means 22 for feature extraction and classification will be pointed out below. It is well-known that the actual number of components is initially unknown for real music signals. In this context, “components” signify both the spectral profiles and the corresponding amplitude envelopes. If the number d of components extracted is too low, artifacts of the non-considered components are very likely to come up in other components. If, on the other hand, too many components are extracted, the most prominent components are divided up into several components. Unfortunately, this division may occur even with the right number of components and may occasionally complicate detection of the real components.

To overcome this problem, a maximum number d of components is specified in the PCA or ICA process. Subsequently, the components extracted are classified using a set of spectral-based and time-based features. Classification is to provide two kinds of information. Initially, those components which are detected, with a high degree of certainty, as non-percussive are to be eliminated from the further procedure. In addition, the remaining components are to be assigned to predefined classes of instruments.

A suitable measure of differentiating between the amplitude envelopes is given by percussivity, mentioned in the third specialist publication. Here, use is made of a modified version wherein the correlation coefficient between corresponding amplitude envelopes is used in $\hat{E}$ and E. The degree of correlation between both vectors tends to be small if the characteristic plateaus related to harmonically sustained tones come up in the non-differentiated amplitude envelopes E. The latter are very likely to disappear in the differentiated version $\hat{E}$. Both vectors are much more similar in the case of transient amplitude envelopes stemming from percussive tones. For this purpose, reference shall be made to FIGS. 3*a* and 4*a*. FIG. 3*a* shows an amplitude envelope, rising very fast and very high, for a percussive source, whereas FIG. 4*a* shows an amplitude envelope for a harmonically sustained instrument. FIG. 3*a* is an amplitude envelope for a kick drum, whereas FIG. 4*a* is an amplitude envelope for a trumpet. From the amplitude envelope for the trumpet, a relatively rapid rise is depicted, followed by a relatively slow dying away, as is typical of harmonically sustained instruments. On the other hand, the amplitude envelope for a percussive element, as is depicted in FIG. 3*a*, rises very fast and very high, but then falls off equally fast and steeply, since a percussive tone typically does not linger on, or die off, for any particular length of time due to the nature of the generation of such a tone.

Thus, the amplitude envelopes may be used for classification and/or feature extraction equally well as the profile spectra, explained below, which clearly differ in the case of a percussive source (FIG. 3*b*; hi-hat) and in the case of a harmonically sustained instrument (FIG. 4*b*; guitar). Thus, with a harmonically sustained instrument, the harmonics are strongly developed, whereas the percussive source has a rather noise-like spectrum which has no clearly pronounced harmonics, but which in total has a range in which energy is concentrated, this range of concentrated energy being highly broad-band.

Thus, a spectral-based measure, i.e. a measure derived from the profile spectra (e.g. FIGS. 3*b* and 4*b*), is used to separate spectra of harmonically sustained tones from spectra related to percussive tones. Again, in the preferred embodiment, a modified version of calculating this measure is used which exhibits a tolerance towards spectral lag phenomena, a dissonance with all harmonics, and suitable normalization. A higher degree in terms of computational efficiency is achieved by replacing an original dissonance function by a weighting matrix for frequency pairs.

Assigning spectral profiles to pre-defined classes of percussive instruments is provided by a simple classifier for classifying the k next neighbor with spectral profiles of individual instruments as a training database. The distance function is calculated from at least one correlation coefficient between a query profile and a database profile. In order to verify the classification in cases of low reliability, i.e. at low correlation coefficients, or to verify multiple occurrences of the same instruments, additional features are extracted which provide detailed information about the form of the spectral profile. These features include the individual features already mentioned above.

In the following, the functionality of the decider 24 in FIG. 2 will be dealt with. Drum-like onsets are detected in the amplitude envelopes, such as in the amplitude envelope in FIG. 3*a*, using common peak selection methods, also referred to as peak picking. Only peaks occurring within a tolerance range in addition to the original times t, i.e. the times in which the maximum searcher 16*c* provided a result, are primarily considered as candidates for onsets. Any remaining peaks extracted from the amplitude envelopes are initially stored for further considerations. The value of the amount of the amplitude envelope is associated with each onset candidate at the position thereof. If this value does not exceed a predetermined dynamic threshold value, the onset will not be accepted. The threshold varies, across the amount of energy, in a relatively large time range surrounding the onsets. Most of the crosstalk influence of harmonically sustained instruments and of percussive instruments being played at the same time may be reduced in this step. In addition, it is preferred to differentiate as to whether simultaneous onsets of various percussive instruments actually exist, or exist only on the grounds of crosstalk effects. A solution to this problem preferably is to accept these further occurrences, whose value is relatively high in comparison with the value of the most intense instrument at the time of onset.

In accordance with the invention, automatic detection, and preferably also automatic classification, of non-pitched percussive instruments in real polyphonic music signals is thus achieved, the starting basis for this being the profile spectra, on the one hand, and the amplitude envelope, on the other hand. In addition, the rhythmic information of a piece of music may also be easily extracted from the percussive instruments, which in turn is likely to lead to a favorable note-to-note transcription.

Depending on the circumstances, the inventive method for analyzing an information signal may be implemented in hardware or in software. Implementation may occur on a digital storage medium, in particular a disc or CD with electronically readable control signals which can interact with a programmable computer system such that the method is performed. Generally, the invention thus also consists in a computer program product with a program code, stored on a machine-readable carrier, for performing the method, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for analyzing an information signal, comprising:

an extractor for extracting significant short-time spectra or significant short-time spectra derived from short-time spectra of the information signal, from the information signal, the extractor being configured to extract such short-time spectra which come closer to a specific characteristic than other short-time spectra of the information signal;

a decomposer for decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought, wherein the decomposer is configured to add the extracted short-time spectra in a weighted manner so as to obtain a reduced number of short-time spectra extracted; and a calculator for calculating an amplitude envelope for the tone sources, an amplitude envelope for a tone source indicating how a profile spectrum of the tone source changes over time, using the profile spectra and a sequence of short-time spectra representing the information signal.

2. The device as claimed in claim 1, wherein the extractor is configured to pre-process the information signal such that signal portions present in the information signal at higher frequencies are accentuated, in the information signal, compared to signal portions present in the information signal at lower frequencies.

3. The device as claimed in claim 2, wherein the extractor is configured to subject the information signal to high-pass filtering, distort the high-pass filtered version of the information signal in a non-linear manner, and add the non-linearly distorted signal to the original information signal in pre-processing.

4. The device as claimed in claim 3, wherein the extractor is configured to subject the information signal to a time-range/frequency-range conversion to obtain a sequence of short-time spectra, the short-time spectra adjacent in time relating to portions of the information signal which overlap except for a hopping interval defined as a time period between at least some of the short-time spectra adjacent in time.

5. The device as claimed in claim 4, wherein each short-time spectrum comprises a sequence of spectral coefficients, and wherein the extractor is configured to differentiate the sequence of short-time spectra in terms of time to obtain a sequence of differentiated short-time spectra, a differentiated short-time spectrum providing information about changes in a short-time spectrum compared to a preceding or subsequent short-time spectrum.

6. The device as claimed in claim 5, wherein the extractor is configured to obtain a differentiated short-time spectrum in that for each spectral coefficient, a difference of the spectral coefficient in a current short-time spectrum and a previous or subsequent short-time spectrum is formed.

7. The device as claimed in claim 5, wherein the extractor is configured to rectify the short-time spectra differentiated, so that a differentiated short-time spectrum rectified does not exhibit any negative values.

8. The device as claimed in claim 5, wherein the extractor is configured to determine the significant short-time spectra on the basis of the differentiated short-time spectra.

9. The device as claimed in claim 8, wherein the extractor is configured to sum up, for each differentiated short-time spectrum, spectral coefficients, or values derived from spectral coefficients, so as to obtain a cumulative value for a short-time spectrum, so that a detection function over time results.

10. The device as claimed in claim 9, wherein the extractor is configured to smooth the detection function over time.

11. The device as claimed in claim 9, wherein the extractor is configured to find maxima in the detection function at a point in time, and to use a differentiated short-time spectrum or a short-time spectrum as a significant spectrum having a point in time associated with it at which the detection function exhibits a maximum.

12. The device as claimed in claim 9, wherein the extractor is configured to regard only such maxima of the detection function as significant which are spaced apart in time by more than a predefined time period.

13. The device as claimed in claim 4, wherein the extractor is configured to determine amount spectra as a sequence of short-time spectra, and to use phase information of the short-time spectra when extracting the significant short-time spectra.

14. The device as claimed in claim 1, wherein the decomposer is configured to perform a principal component analysis for dimension reduction so as to obtain processed short-time spectra.

15. The device as claimed in claim 1, wherein the decomposer is configured to perform an independent component analysis to produce a plurality of component signals, a component signal being associated with an information source contributing to the information signal.

16. The device as claimed in claim 1, wherein the calculator for calculating the amplitude envelope is configured to multiply a matrix including the profile spectra, and a matrix including a sequence of short-time spectra of the information signal, so as to obtain the amplitude envelopes for the tone sources.

17. The device as claimed in claim 1, wherein the calculator for calculating the amplitude envelope is configured to further determine a differentiated amplitude envelope using the profile spectra for the tone sources and using the difference spectrogram.

18. The device as claimed in claim 1, further comprising a classifier for classifying the component signals into percussive component signals and non-percussive component signals.

19. The device as claimed in claim 18, wherein the classifier is configured to perform a classification on the basis of the profile spectra and/or the amplitude envelopes.

20. The device as claimed in claim 18, wherein the classifier is configured to extract a feature from the profile spectra or the amplitude envelopes, and to compare it with features of known sources in a database.

21. The device as claimed in claim 1, further comprising an examiner for examining the amplitude envelopes for a tone source so as to accept a maximum in the amplitude envelope as an onset of a signal from the tone source in case the extractor had extracted a significant short-time spectrum at a point in time which was similar within a threshold.

22. The device as claimed in claim 1, wherein the calculator for calculating the amplitude envelope is configured to calculate the amplitude envelope for a tone source in such a manner that the amplitude envelope indicates how an intensity or weighting of a profile spectrum of the tone source changes over time.

23. A method for analyzing an information signal, comprising:

extracting significant short-time spectra or significant short-time spectra derived from short-time spectra of the information signal, from the information signal, the short-time spectra extracted being such short-time spectra which come closer to a specific characteristic than other short-time spectra of the information signal;

decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought, wherein the decomposing includes adding the extracted short-time spectra in a weighted manner so as to obtain a reduced number of short-time spectra extracted; and calculating an amplitude envelope for the tone sources, an amplitude envelope for a tone source indicating how a profile spectrum of the tone source changes over time, using the profile spectra and a sequence of short-time spectra representing the information signal.

24. A tangible computer storage medium having stored thereon a computer program having a program code for performing a method for analyzing an information signal, which when executed by a computer, results in the computer performing the method comprising:

extracting significant short-time spectra or significant short-time spectra derived from short-time spectra of the information signal, from the information signal, the short-time spectra extracted being such short-time spectra which come closer to a specific characteristic than other short-time spectra of the information signal;

decomposing the extracted short-time spectra into component signal spectra, a component signal spectrum representing a profile spectrum of a tone source which generates a tone corresponding to the characteristic sought for, and another component signal spectrum representing a profile spectrum of another tone source which generates a tone corresponding to the characteristic sought, wherein the decomposing includes adding the extracted short-time spectra in a weighted manner so as to obtain a reduced number of short-time spectra extracted; and calculating an amplitude envelope for the tone sources, an amplitude envelope for a tone source indicating how a profile spectrum of the tone source changes over time, using the profile spectra and a sequence of short-time spectra representing the information signal, when the computer program runs on a computer.

* * * * *

UNITED STATES PATENT AND TRADEMARK OFFICE
CERTIFICATE OF CORRECTION

PATENT NO. : 7,565,213 B2
APPLICATION NO. : 11/123474
DATED : July 21, 2009
INVENTOR(S) : Christian Dittmar et al.

It is certified that error appears in the above-identified patent and that said Letters Patent is hereby corrected as shown below:

On page 2, in column 2, under "Other Publications", line 13, delete "Darthmouth" and insert -- Dartmouth --, therefor.

In column 2, line 55, delete "Darthmouth" and insert -- Dartmouth --, therefor.

In column 6, line 60, before "sources" delete "-sources".

In column 8, line 11, delete "providing:" and insert -- providing --, therefor.

In column 8, line 22, delete "each-individual" and insert -- each individual --, therefor.

In column 9, line 27, delete "castagnets," and insert -- castanets, --, therefor.

In column 12, line 53, delete "The-whitened" and insert -- The whitened --, therefor.

In column 12, line 64, delete "rottions" and insert -- rotations --, therefor.

In column 14, lines 27–28, delete "specialized-spectral" and insert -- specialized spectral --, therefor.

In column 14, line 62, delete "Êand" and insert -- Ê and --, therefor.

Signed and Sealed this

Sixth Day of October, 2009

David J. Kappos
*Director of the United States Patent and Trademark Office*